United States Patent [19]

Ueda et al.

[11] Patent Number: 5,188,376
[45] Date of Patent: Feb. 23, 1993

[54] GLAND PACKING AND METHOD OF PRODUCING SAME

[75] Inventors: Takahisa Ueda; Shuzo Konaka; Takeshi Miyoshi, all of Sanda, Japan

[73] Assignee: Nippon Pillar Packing Co., Ltd., Osaka, Japan

[21] Appl. No.: 650,940

[22] Filed: Feb. 5, 1991

[30] Foreign Application Priority Data

Feb. 26, 1990 [JP] Japan .................................. 2-46558

[51] Int. Cl.⁵ ............................................. F16J 15/20
[52] U.S. Cl. .................................. 277/227; 277/233; 277/102; 277/213
[58] Field of Search ............... 277/229, 233, 203, 204, 277/230, 213, 200, 102

[56] References Cited

U.S. PATENT DOCUMENTS

| | | | |
|---|---|---|---|
| 657,548 | 9/1900 | Kelsey | 277/213 |
| 1,325,876 | 12/1919 | McClure | 277/229 |
| 1,514,192 | 11/1924 | Bausman | 277/203 |
| 1,601,381 | 9/1926 | Thompson | 277/203 |
| 1,779,225 | 10/1930 | Bausman | 277/227 |
| 1,780,051 | 10/1930 | Walker | 277/213 |
| 1,796,882 | 3/1931 | Bowers | 277/213 |
| 1,932,809 | 10/1933 | Wheeler | 277/203 |
| 2,267,322 | 12/1941 | Bowers | 277/213 |
| 2,267,368 | 12/1941 | Bowers | 277/213 |
| 2,292,041 | 8/1942 | Bowers | 277/213 |
| 2,583,873 | 1/1952 | Nichols | 277/227 |
| 2,819,919 | 1/1958 | Pearce et al. | 277/204 |
| 2,951,721 | 9/1960 | Asp | 277/227 |
| 3,117,795 | 1/1964 | Price | 277/204 |
| 3,341,211 | 9/1967 | Houghton et al. | 277/230 |
| 3,854,731 | 12/1974 | Gealt | 277/233 X |
| 4,298,562 | 11/1981 | Latty | 277/204 X |
| 4,705,722 | 11/1987 | Ueda | 428/365 |
| 4,961,988 | 10/1990 | Xiang Zhu | 428/229 |

FOREIGN PATENT DOCUMENTS

| | | | |
|---|---|---|---|
| 0005647 | of 1904 | United Kingdom | 277/227 |
| 0005466 | of 1905 | United Kingdom | 277/233 |
| 0213392 | 4/1924 | United Kingdom | 277/227 |

Primary Examiner—William A. Cuchlinski, Jr.
Assistant Examiner—James K. Folker
Attorney, Agent, or Firm—Jones, Tullar & Cooper

[57] ABSTRACT

The packing according to the present invention is composed of a string-like body formed of an elongated tape-like packing material having at least one layer is repeatedly folded in direction at a right angle to the longitudinal direction thereof in a zigzag manner with peak portions and valley portions alternately formed. According to the packing, the string-like body cut into a predetermined length according to the diameter of a shaft with which it is to be used may be wound on the outer peripheral surface of the shaft with the width or thickness direction of the string-like body directed in the radial direction of the shaft. Thus, the packing is versatile with respect to the shaft diameter. The packing itself produces no slip in the axial direction of a shaft. This prevents the packing from protruding, thus eliminating stress release due to a decrease in volume. The packing is used with the string-like body folded in the three-dimensional directions. Accordingly, the shaft-following properties of the packing at the time when the same is worn, are satisfactory and the decrease in sealing properties is restrained.

5 Claims, 5 Drawing Sheets

GLAND PACKING AND METHOD OF PRODUCING SAME

BACKGROUND OF THE INVENTION

1. Field of the Invention

The present invention relates to a packing to be suitably used as a gland packing used at an axial sealing portion of a fluid device, and also relates to a method of producing such a packing.

As a gland packing used for preventing a fluid from leaking along the outer peripheral surface of a rotary shaft in a fluid device, there is known, for example, an arrangement in which a ring-like packing is disposed at an annular space between a rotary shaft and a packing box disposed at the outer periphery thereof and in which a packing gland is used to prevent the packing from being axially moved to, thereby maintain the packing at a predetermined position.

2. Discussion of the Prior Art

The following packings are known as the packing of the above-mentioned type to seal the shaft of a fluid device. One packing is made by winding a tape-like packing material spirally or concentrically and pressing and molding, in molds, the packing material thus wound, thereby to form a ring-like packing of the die-mold type. Another packing is made by punching ring-like pieces from a sheet-like packing material, and laminating and molding a plurality of ring-like pieces thus punched, thereby to form a packing of the laminate type. A further packing is made by cutting a packing material into narrow tapes, braiding the tapes thus cut to form a braided body, and winding the braided body, as a braided packing, on the outer peripheral surface of a shaft.

In such conventional packings, the inner diameter of the packing of the die-mold type is determined at the production step. This prevents the same packing from being used for each of the shafts having different diameters. Thus, such a packing lacks versatility. It is therefore required to previously prepare a variety of packings having different diameters in order to deal with shafts having different diameters.

Further, such a packing is arranged such that layers are formed in the radial direction. This tends to produce an axial slip of the layers between adjacent layers. This causes portions of the packing to protrude into gaps, for example, between the shaft and the packing box, between the shaft and the packing gland and between the packing box and the packing gland. This reduces the volume of the packing with a consequent stress release, causing the sealing properties to be lowered. This disadvantageously increases the amount of leakage of a fluid.

It is possible to use tape-like materials having different characteristics as impregnated with, for example, a lubricant in order to enhance the lubricating properties of the packing. Even in this case, however, the tape-like materials cannot be exposed to the inner peripheral surface of the packing in order that the tape-like materials come in contact with a shaft. Thus, high lubricating properties cannot be assured.

The packing of the laminate type is arranged such that layers are formed in the axial direction. This prevents portions of the packing from protruding into the gaps mentioned above, as done in the packing of the die-mold type. This eliminates the stress release due to reduction in volume. Accordingly, the decrease in sealing properties is small. Further, the tape-like materials respectively having different characteristics, may be exposed onto the inner peripheral surface of the packing, so that the materials come in contact with the shaft, thus assuring high lubricating properties and the like, likewise the packing of the die-mold type. However, the packing of the laminate type lacks versatility since the same packing cannot be used for each of shafts having different diameters. It is therefore required to previously prepare a variety of packings to deal with shafts having different diameters. Further, when the inner peripheral surface (inner peripheral portion) of the packing which slides on and comes in contact with the shaft, is worn, the packing cannot follow the shaft satisfactorily. This disadvantageously presents the problem that the sealing properties are gradually lost with the passage of time.

As compared with these packings of the die-mold type and the laminate type, the braided packing may be cut into a predetermined length according to the diameter of the shaft and wound on the outer peripheral surface of the shaft. This improves the versatility with respect to the shaft diameter. However, braiding itself is complicated and requires a number of production steps, thus lowering the productivity. Further, it is required to use yarn that is excellent in tensile strength and toughness. This imposes great restrictions on the scope of yarn to be, used, thus increasing the cost.

These conventional packings mentioned above are not satisfactory in view of the need to dissipating heat developed at that portion of each packing which slides on the shaft. This may provoke a decrease in sealing properties due to thermal deterioration, seizure and the like.

SUMMARY OF THE INVENTION

In view of the foregoing, the present invention is proposed with the object of providing a packing which is adapted to be used as wound on the outer peripheral surface of a shaft, thereby to improve the versatility with respect to the shaft diameter, which prevents stress release due to reduction in volume and subsequent decease in sealing properties, and which has improved shaft-following properties when worn and improved heat dissipation, thereby avoiding a decrease in sealing properties.

It is another object of the present invention to provide a packing which is improved in shape retention to further improve the sealing properties thereof.

It is a further object of the present invention to provide a packing in which materials respectively having different characteristics, are adapted to come in contact with a shaft, thereby to improve the lubricating properties of the packing.

It is still another object of the present invention, to provide a strong packing having excellent tensile strength.

It is a still further object of the present invention to provide a packing which has improved sealing properties and a decreased in friction coefficient, and which minimizes axial slip thereof.

It is yet another object of the present invention to provide a method of easily producing a packing excellent in versatility and having a variety of performances.

To achieve the objects mentioned above, the packing in accordance with the present invention comprises a string-like body in which a tape-like packing material is folded in the thickness direction thereof in zigzags with peak portions and valley portions alternately formed.

According to the packing having the arrangement mentioned above, the stringlike body cut into a predetermined length according to the diameter of the shaft may be used as wound on the outer peripheral surface of the shaft with the width direction or thickness direction of the string-like body directed in the radial direction of the shaft, Thus, the packing of the present invention may have improved versatility with respect to the shaft diameter.

Further, the string-like body is formed by folding the tape-like packing material having at least one layer in the thickness direction thereof in zigzags with peak portions and valley portions alternately formed. Accordingly, even though the string-like body is used as wound on the outer peripheral surface of a shaft with the width direction or thickness direction of the string-like body directed in the radial direction of the shaft, the packing itself produces no axial slip. This prevents portions of the packing from protruding into gaps. This eliminates stress release due to a decrease in volume of the packing, thus preventing the sealing properties thereof from being lowered. The string-like body as cut into a predetermined length may be molded in the form of a ring with the use of molds. In such a ring-like packing, the cut portions may be readily opened.

Tape-like packing materials having two or more layers may be folded in the thickness direction thereof in zigzags with peak portions and valley portions alternately formed, and the materials respectively having different characteristics may be used. In this case, the materials having different characteristics may come in contact with the shaft. Accordingly, when a small amount of oil is contained in the materials, the lubricating properties of the packing may be improved.

Further, the packing is adapted to be wound on the outer peripheral surface of the shaft with the string-like body folded in the three-dimensional directions. Accordingly, the shaft-following properties of the packing at the time when the same is worn, are improved to prevent the sealing surface pressure from being lowered. This securely prevents the sealing properties of the packing from being lost with the passage of time.

Further, since the packing is adapted to be wound on the outer peripheral surface of the shaft, the distances between opposite surfaces, as folded, of the string-like body are increased in the direction from the radially inner part to the radially outer part, and the tape-like packing material is disposed at a right angle to the shaft. This improves the dissipation of heat developed at the radially inner part. This securely prevents the occurrence of seizure in the packing, and also prevents the sealing properties thereof from being lowered due to thermal deterioration.

According to the present invention, the stringlike body may be pressed in a direction at a right angle to the folding direction. In such a packing, the string-like body may be increased in density to improve the shape retention thereof.

According to the present invention, the valley portions may be secured by a binding member. In such a packing, the string-like body as folded in the three-dimensional directions may be fixed to further improve the shape retention thereof.

According to the present invention, portions of opposite surfaces, as folded, of the string-like body may be bonded with adhesive. Likewise the packing mentioned earlier, such a packing is also improved in shape retention.

According to the present invention, the tape-like packing material may comprise a plurality of layers and a reinforcing material may be disposed between adjacent layers. In such a packing, the string-like body may be improved in strength, particularly in tensile strength, and its fastening surface pressure to the outer peripheral surface of the shaft is increased to improve the sealing properties, while improving durability.

According to the present invention, each of a plurality of layers of tape-like packing materials may be made of an expanded graphite tape, of which at least a portion in the vicinity of one edge thereof may be covered with a polytetrafluoroethylene tape. Such a packing may have improved sealing properties and exhibit a decrease in the frictional resistance between the packing and the peripheral surface of a shaft in which it is used. Further, such a packing may be suitably used in a clean industry where it is desired to prevent the atmosphere from being polluted.

Other features and operational effects of the present invention will be apparent from the following description of embodiments thereof.

DETAILED DESCRIPTION OF THE PREFERRED EMBODIMENTS

Figure 1:
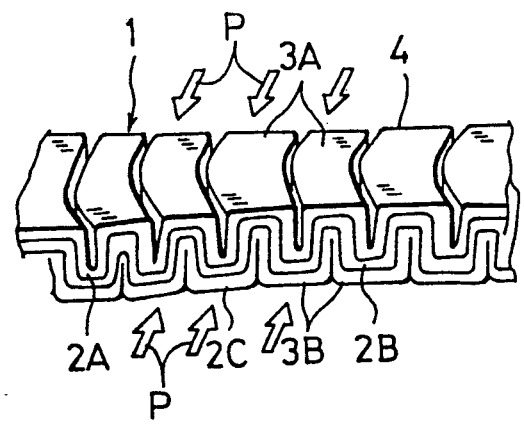
FIG. 1 is a perspective view of a packing in accordance with an embodiment of the present invention.

FIG. 1 is a perspective view of the main portions of a packing 1 in accordance with a first embodiment of the present invention. In FIG. 1, the packing 1 is composed of a string-like body 4 having a three-layer structure in which three tape-like packing materials 2A, 2B, 2C are laminated and folded together in the thickness direction in zigzags with peaks portions 3A and valley portions 3B alternately formed. The string-like body 4 is pressed in a direction at a right angle to the folding direction, i.e., thickness direction, as shown by arrows P, so that the shape thereof is retained with each portion thereof bent in a dog-leg shape.

Each of the tape-like packing materials 2A, 2B, 2C is made of expanded graphite having a thickness of 0.38 mm, a width of 12.5 mm and a density of 1.0 g/cm$^3$. When the string-like body 4 is pressed as mentioned above, its density is increased to 1.38 g/cm$^3$, thus improving the shape retention of the string-like body 4.

Figure 3:
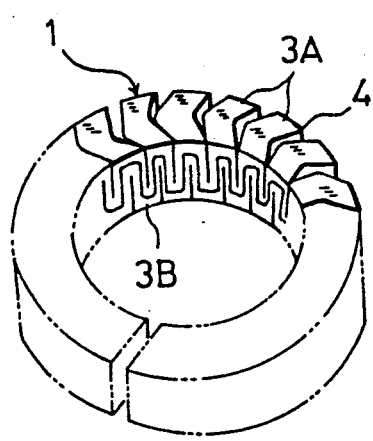
FIG. 3 is a partial view in perspective of the string-like body in FIG. 1, as cut into a predetermined length and bent in the form of a ring.
Figure 2:
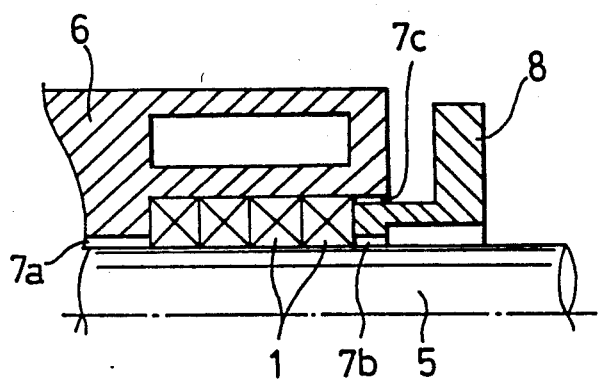
FIG. 2 is a section view illustrating an example of how to use the packing in FIG. 1.

According to this arrangement, the string-like body 4 may be cut into a predetermined length, for example, according to the diameter of a shaft 5 as shown in FIG. 2 and bent in the form of a ring with the width direction of the string-like body 4 directed in the radial direction of the ring as shown in FIG. 3, so that the string-like body 4 is wound on the outer peripheral surface of the shaft 5. Thus, the string-like body 4 may be used as cut according to the shaft diameter to improve the versatility thereof with respect to the shaft diameter. It is therefore not required to previously prepare a variety of packings having different sizes to deal with shafts having different diameters.

Further, even though the packing 1 is wound on the outer peripheral surface of the shaft 5 with the width direction of the string-like body 4 directed in the radial direction, no layers are formed in the axial direction. This produces no slip of layers of the packing 1 in the axial direction. Accordingly, the packing 1 does not protrude into a gap 7a between the shaft 5 and a packing box 6, a gap 7b between the shaft 5 and a packing gland 8, and a gap 7c between the packing box 6 and the packing gland 8 as shown in FIG. 2. This eliminates stress release due to a decrease in volume, thus preventing the sealing properties of the packing 1 from being lowered.

The string-like body 4 is folded in the thickness direction in zigzags with peak portions and valley portions alternately formed. Further, the string-like body 4 is pressed in a direction at a right angle to the thickness direction thereof, so that each of the portions thereof is bent in a dog-leg shape. Thus, the string-like body 4 is wound, as folded in the three-dimensional directions, on the outer periphery of the shaft 5. Accordingly, the shaft-following properties of the packing 1 at the time when the same is worn, are improved to prevent the sealing surface pressure from being lowered. This securely prevents the sealing properties of the packing 1 from being lost with the passage of time.

Figure 4:
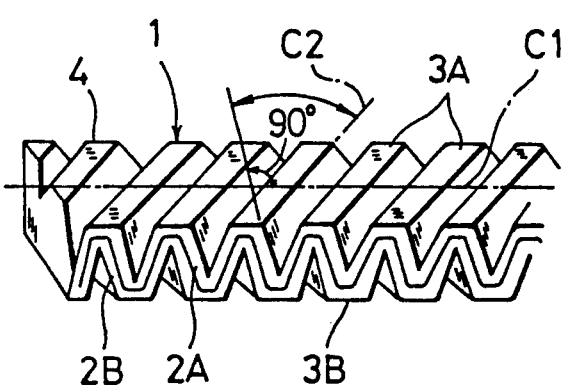
FIG. 4 is a perspective view of portions of a packing in accordance with a second embodiment of the present invention.

FIG. 4 shows a second embodiment of the present invention. In this second embodiment, the packing 1 is composed of a string-like body 4 which has a two-layer structure in which two tape-like packing materials 2A, 2B are laminated and folded together in the thickness direction thereof in zigzags with peak portions 3A and valley portions 3B alternately formed. By applying a shear force in the width, direction of the string-like body 4, the peak portions 3A and the valley portions 3B are first inclined such that the transverse axis C2 of the string-like body 4 crosses the longitudinal axis C1 thereof on the same plane at an angle greater than 90°. Then, the string-like body 4 is retained in shape as pressed in a direction at a right angle to the folding direction.

Figure 5:
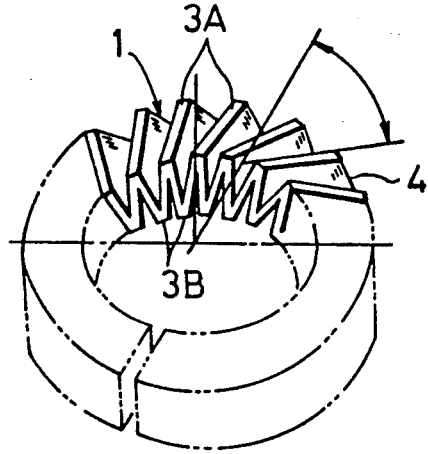
FIG. 5 is a partial view in perspective of the string-like body in FIG. 4, as cut into a predetermined length and bent in the form of a ring.

According to the packing 1 having the arrangement mentioned above, the string-like body 4 may be cut into a predetermined length, for example, according to the diameter of the shaft 5 in FIG. 2. Then, the string-like body 4 may be wound on the outer peripheral surface of the shaft 5 as bent in the form of a ring with the width direction of the string-like body 4 directed in the radial direction, as shown in FIG. 5. Thus, the packing 1 of the second embodiment may produce operational effects similar to those of the packing 1 of the first embodiment.

Figure 6:
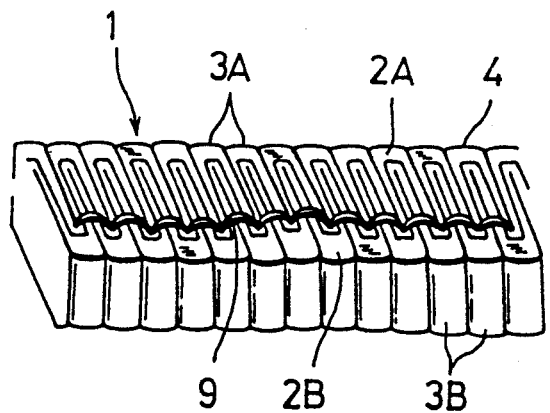
FIG. 6 is a perspective view of the main portions of a packing in accordance with a third embodiment of the present invention.

FIG. 6 shows a third embodiment of the present invention. In this third embodiment, the packing 1 is composed of a string-like body 4 having a two-layer structure in which two tape-like packing materials 2A, 2B are laminated and folded together in the thickness direction thereof in zigzags with peak portions 3A and valley portions 3B alternately formed. In the string-like body 4, the valley portions 3B are secured and retained in shape by a binding member 9 made of organic fibers, inorganic fibers, metallic thin wires or the like.

Figure 7:
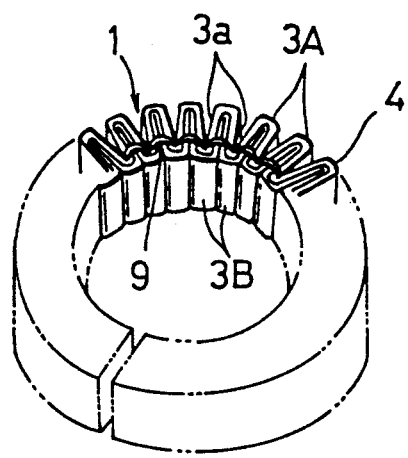
FIG. 7 is a partial view in perspective of the string-like body in FIG. 6, as cut into a predetermined length and bent in the form of a ring.

The packing having the arrangement mentioned above may be used such that the string-like body 4 is cut into a predetermined length, for example, according to the diameter of the shaft 5 in FIG. 2, and then wound on the outer peripheral surface of the shaft 5 as bent in the form of a ring with the thickness direction of the string-like body 4 directed in the radial direction of the ring as shown in FIG. 7. Thus, the packing of this embodiment may produce operational effects similar to those of the first or second embodiment.

Even though the packing 1 is wound on the outer peripheral surface of the shaft 5 with the thickness direction of the packing 1 directed in the radial direction, of the shaft 5, no layers are formed in the axial direction. This produces no slip of the packing between adjacent layers. This prevents the packing 1 from protruding into the gaps 7a, 7b, 7c above-mentioned, thereby eliminating the stress release due to a decrease in volume. This prevents the sealing properties of the packing from being lowered.

Further, the string-like body 4 is folded in the thickness direction thereof in zigzags with peak portions and valley portions alternately formed, and is secured by the binding member 9. Accordingly, the string-like body 4 may be wound, as bent in the three-dimensional directions, on the outer peripheral surface of the shaft 5. Accordingly, the shaft-following properties of the packing at the time when the same is worn, are improved to prevent the sealing surface pressure from being lowered. This securely prevents the sealing properties of the packing 1 from being lost with the passage of time. Thus, the packing of this embodiment may produce operational effects similar to those of the first and second embodiments.

Figure 8:
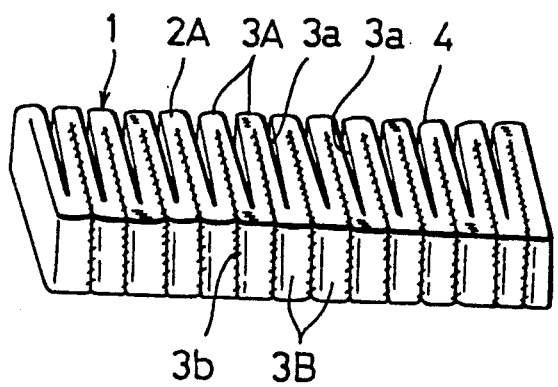
FIG. 8 is a perspective view of the main portions of a packing in accordance with a fourth embodiment of the present invention.
Figure 9:
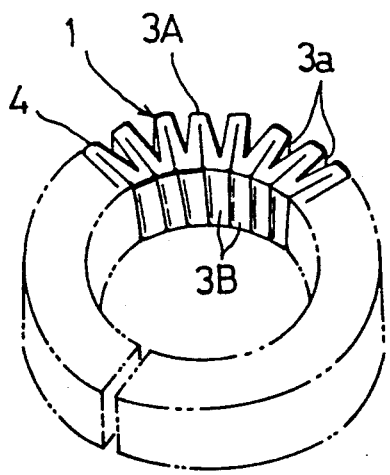
FIG. 9 is a partial view in perspective of the string-like body in FIG. 8, as cut into a predetermined length and bent in the form of a ring.

FIG. 8 shows a fourth embodiment of the present invention. In this fourth embodiment, the packing 1 is composed of a string-like body 4 having a single-layer structure in which a single tape-like packing material 2A is folded in the thickness direction thereof in zigzags with peak portions 3A and valley portions 3B alternately formed. In the string-like body 4, portions of opposite surfaces as folded, i.e., opposite surfaces 3b of adjacent valley portions 3B, are bonded to each other with adhesive, so that the shape of the string-like body 4 is retained. The packing 1 having the arrangement mentioned above may be used such that the string-like body 4 is cut into a predetermined length, for example, according to the diameter of the shaft 5 in FIG. 2 and wound, as bent in the form of a ring, on the outer peripheral surface of the shaft 5 with the thickness direction of the string-like body 4 directed in the radial direction of the ring as shown in FIG. 9. Thus, the packing of this fourth embodiment may produce operational effects similar to those of the third embodiment.

Figure 10:
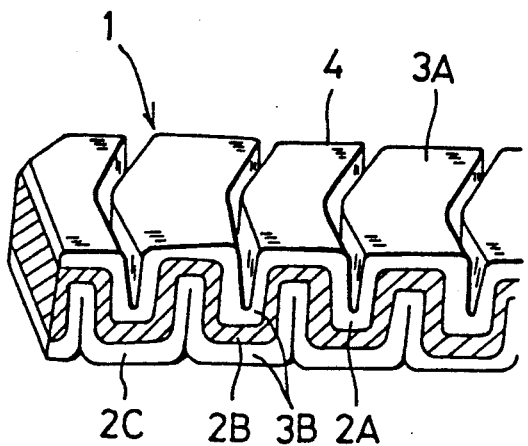
FIG. 10 is a perspective view of the main portions of a packing in accordance with a fifth embodiment of the present invention.
Figure 11:
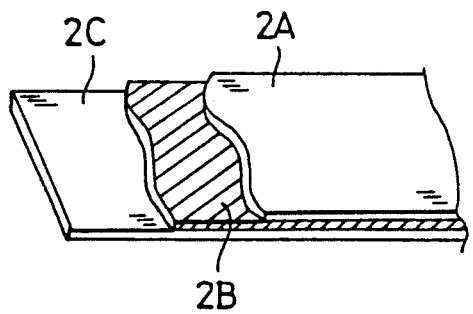
FIG. 11 is a perspective view of a tape-like packing material used in the fifth embodiment of the present invention.

FIG. 10 shows a fifth embodiment of the present invention. In the fifth embodiment, the packing 1 has a three-layer structure in which three tape-like packing materials 2A, 2B, 2C are laminated as shown in FIG. 11 and folded in the, thickness direction thereof in zigzags with peak portions 3A and valley portions 3B alternately formed. Particularly, the tapelike packing material 2B of the intermediate layer is made of an expanded graphite tape impregnated with a lubricant.

Since the packing of the fifth embodiment has the arrangement mentioned above, this packing may produce operational effects similar to those of each of the embodiments mentioned earlier. Further, the intermediate tape-like packing material 2B of expanded graphite may be exposed to the inner peripheral surface of the packing in order that the intermediate tapelike packing material 2B comes in contact with the outer peripheral surface of the shaft 5. This assures high lubricating properties.

FIGS. 12 to 15 respectively show other examples of the tape-like packing material which are improved particularly in tensile strength.

Figure 12:
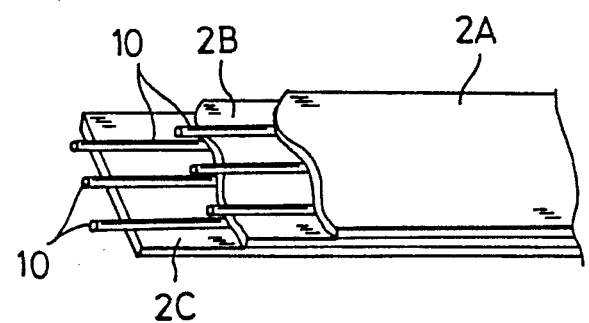
FIG. 12 is a perspective view of the main portions of another example of the tape-like packing material.
Figure 13:
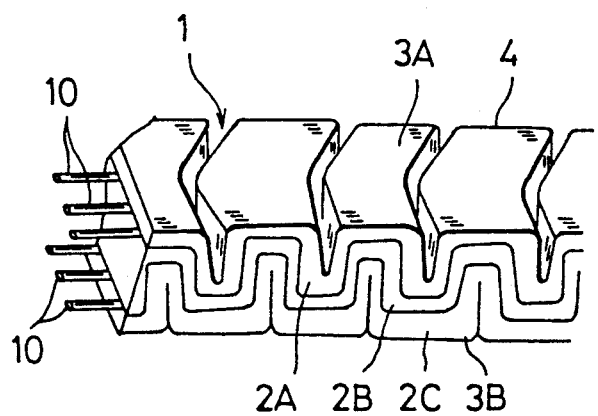
FIG. 13 is a perspective view of the main portions of a string-like body formed by the tape-like packing material shown in FIG. 12.

In the example of the tape-like packing material in FIG. 12, a plurality of reinforcing yarns 10 are disposed between the tape-like packing materials 2A and 2B and between the tape-like packing materials 2B and 2C. With the use of these tape-like packing materials, there may be produced a packing 1 provided with high strength as shown in FIG. 13.

Figure 14:
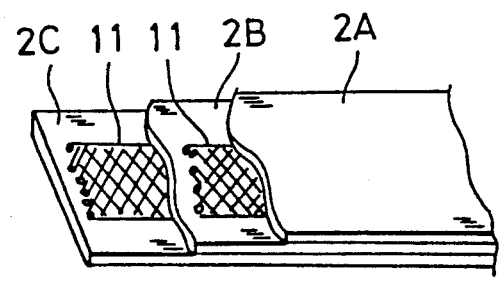
FIGS. 14 and 15 are perspective views of the main portions of further examples of the tape-like packing material.
Figure 15:
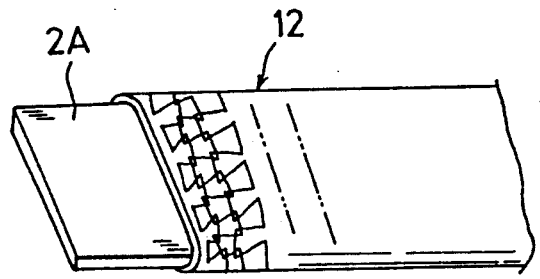

Such a high-strength packing may also be produced by disposing reinforcing net members between the tape-like packing materials 2A and 2B and between the tape-like packing materials 2B and 2C as shown in FIG. 14, or by covering the outer periphery of the tapelike packing material 2A with a braided or knitted body as shown in FIG. 15. Examples of the reinforcing material include: inorganic fibers such as carbon fiber, glass fiber, ceramic fiber and the like; organic fibers such as cotton, polytetrafluoroethylene, Aramid, high-strength polyethylene, high-strength Vinylon, polyphenylene sulfite, polyether etherketone, polyarylate and the like; and metallic fine wires and metallic fibers made of INCONEL, MONEL, stainless steel and the like.

Figure 16:
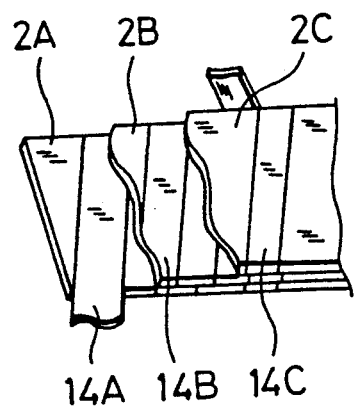
FIGS. 16 and 17 are perspective views of the main portions of still another examples of the tape-like packing material.
Figure 17:
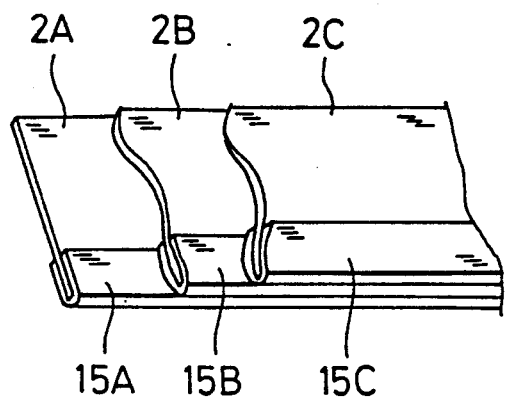

FIGS. 16 and 17 show further examples of the tapelike packing material. In FIG. 16, three tapes of polytetrafluoroethylene 14A, 14B, 14C are respectively wound, as inclined, on three expanded graphite tapes 2A, 2B, 2C. The packing made of these tape-like packing materials may be improved in sealing properties and decreased in friction coefficient. Particularly in a clean industrial field where it is desired to prevent the atmosphere from being polluted, such a packing producing no graphite powder is suitable. Further, in such a composite packing, slips of the layers at the joint surfaces are minimized to restrain the sealing properties from being lowered.

In FIG. 17, tapes of expanded graphite 2A, 2B, 2C are covered, at portions thereof in the vicinity of one edge thereof, with tapes of polytetrafluoroethylene 15A, 15B, 15C as folded in two. A packing made of such tape-like packing materials may produce operational effects similar as those of the packing shown in FIG. 16.

Figure 19:
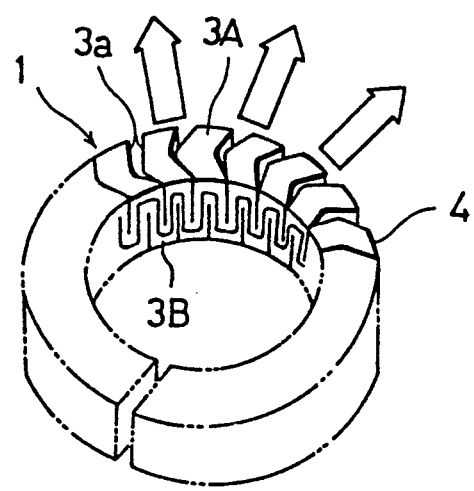
FIG. 19 is a partial view in perspective of the packing of the first embodiment, illustrating how heat is dissipated.

In the packing 1 of each of the embodiments as used, the distances between opposite surfaces 3a, as folded, of the string-like body 4 are increased, as shown in FIG. 19, in the direction from the radially inner part to the radially outer part, and the tapelike packing materials are disposed at a right angle to a shaft on which it is mounted. Accordingly, the packing 1 is improved in dissipation of heat developed at the radially inner part. This securely prevents the occurrence of seizure and also prevents the sealing properties of the packing 1 from being lowered due to thermal deterioration.

Examples of the tape-like packing materials 2A, 2B, 2C include, in addition to the expanded graphite mentioned above: inorganic tapes of mica, vermiculite and the like; resin tapes of polytetrafluoroethylene, Aramid, polyethylene and the like; metallic foil tapes of copper, aluminium, zinc, stainless steel and the like; fibers such as polytetrafluoroethylene fiber, Aramid fiber, glass fiber, polybenzimidazole fiber, polyether etherketone fiber and polyphenylene sulfite fiber; and woven fabrics and unwoven fabrics of metallic wire. These examples may be used alone or in combination of plural types.

The tape-like packing material may be impregnated with polytetrafluoroethylene fine powder, wax, mineral oil or the like as necessary before or after the tape-like packing material is made in the form of a string-like body.

Figure 18:
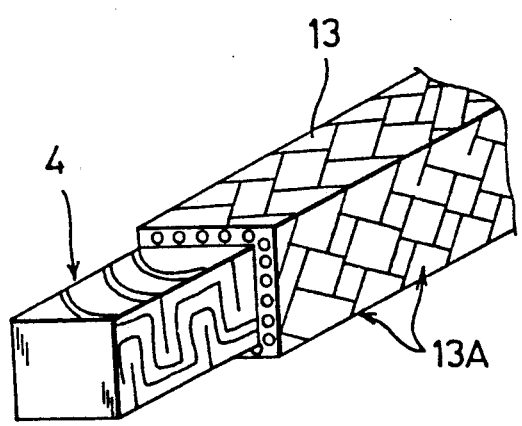
FIG. 18 is a perspective view of the main portions of a packing in accordance with a sixth embodiment of the present invention.

FIG. 18 shows a sixth embodiment of the present invention. In this embodiment, the packing 1 is a braided packing using, as the center member thereof, the string-like body 4 of the first embodiment which is covered at the periphery thereof with a covering layer 13 of carbon fibers.

Examples of the material used for knitting yarn 13A which forms the covering layer 13 include, in addition to carbon fiber; inorganic fibers such as glass fiber, ceramic fiber and the like; organic fibers such as cotton, polytetrafluoroethylene, Aramid, highstrength polyethylene, high-strength Vinylon, polyphenylene sulfite, polyether etherketone, polyarylate and the like; and metallic fine wires and metallic fibers made of INCONEL, MONEL, stainless steel and the like.

Data of Examples of the present invention and data of comparative examples are shown in Tables 1, 2 and 3.

TABLE 1

| Sample | Sealing Properties (Unit CC/min) | | | |
| | Fastening Surface Pressure (Kg/cm$^2$) | | | |
| | 100 | 200 | 300 | 400 |
| --- | --- | --- | --- | --- |
| Comparative Example | 40 | 0 | 0 | 0 |

TABLE 1-continued

| | Sealing Properties (Unit CC/min) | | | |
|---|---|---|---|---|
| | Fastening Surface Pressure (Kg/cm$^2$) | | | |
| Sample | 100 | 200 | 300 | 400 |
| (Die-mold packing of expanded graphite) Comparative Example | 300 | 20 | 1 | 0 |
| (Braided packing of expanded graphite) Example 1 | 1200 | 0.9 | 0 | 0 |
| (String-like body) Example 1 | 32 | 0 | 0 | 0 |
| (Ring-molded packing) | 32 | 0 | 0 | 0 |

Test Conditions:
Four pieces (each of φ32 × φ48 × 8□) were used.
As a fluid, N$^2$ gas (21 kg/cm$^2$) was used.

TABLE 2

| Characteristics of Stress Release | |
|---|---|
| Sample | Residual Stress Ratio |
| Comparative Example (Braided packing of asbestor fibers) | 65% |
| Comparative Example (Braided packing of expanded graphite) | 91% |
| Example 1 (Ring-molded packing) | 97% |

Test Conditions:
Packing (each or inner dia. φ32 × outer dia. φ48 × 8□) were used.

TABLE 3

| Characteristics of Deformation of Ring-Molded Packing | |
|---|---|
| Sample | Opening Amount W |
| Comparative Example (Die-mold packing of expanded graphite) | 12.0 mm |
| Comparative Example (Die-mold packing of expanded graphite) | 0.8 mm |
| Example 1 (Ring-molded packing) | 73.5 mm |

Test Conditions:
Packings (each of inner dia. φ32 × outer dia. φ48 × 8□) were used.

Figure 20:
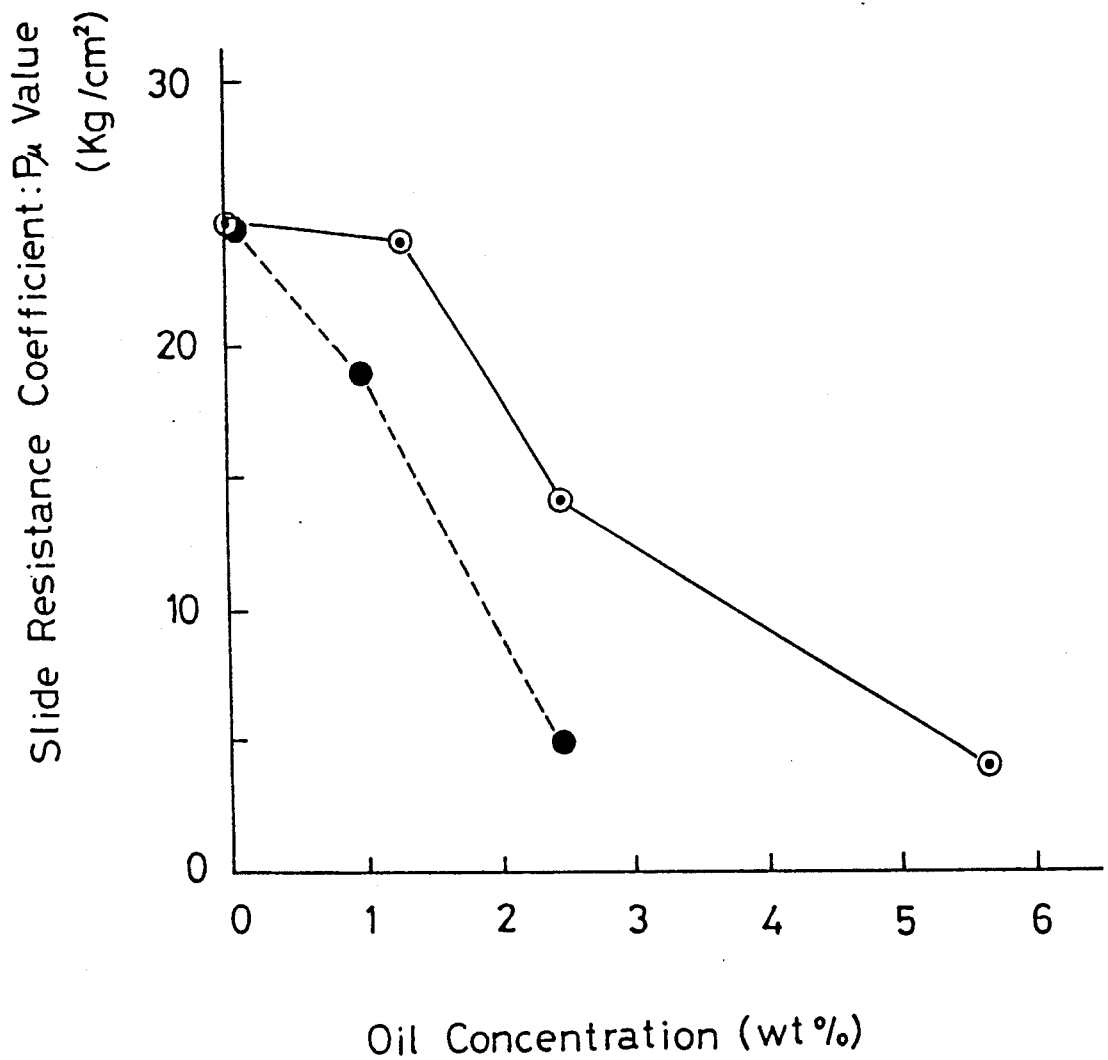
FIG. 20 is a graph showing the relationship between oil concentration and sliding resistance.

FIG. 20 is a graph showing data which represent one of the operational effects achieved by the packing of the present invention, in which the materials respectively having different characteristics are adapted to come in contact with a shaft, so that the lubricating properties of the packing containing a small amount of oil are improved. In FIG. 20, a solid line shows the characteristics of a conventional die-mold packing of expanded graphite, while a dotted line shows the characteristics of the packing in accordance with the fifth embodiment of the present invention. The data in FIG. 20 are those obtained with a fastening surface pressure of 400 kgs/cm$^2$ applied to four packings each of inner dia. φ38× outer dia. φ48×8□.

What is claimed is:

1. A packing comprising a string-like body formed of an elongated tape-like packing material having at least one layer repeatedly folded in a direction at a right angle to the longitudinal direction thereof in a zigzag manner with peak portions and valley portions alternately formed; and bent in a dogleg manner in a direction transverse to the longitudinal direction, said tape-like packing material comprising one of expanded graphite, mica and polytetrafluoroethylene fiber.

2. A packing according to claim 1, wherein the string-like body is pressed in a direction at a right angle to the folded direction.

3. A packing according to claim 1, wherein the tape-like packing material further comprises at least one material selected for the group consisting of: an inorganic tape; a resin tape; a metallic foil tape; aramid fiber; glass fiber; polyether etherketone fiber; polyphenylene sulfite fiber; a wave fabric of metallic wire; and an unwoven fabric of metallic wire.

4. A packing according to claim 1, wherein the tape-like packing material comprises a plurality of layers, and a reinforcing material is disposed between adjacent layers.

5. A packing according to claim 1, wherein the tape-like packing material comprises a plurality of layers, of which at least one layer is impregnated with lubricant.

* * * * *

UNITED STATES PATENT AND TRADEMARK OFFICE
CERTIFICATE OF CORRECTION

PATENT NO. : 5,188,376

DATED : February 23, 1993

INVENTOR(S) : Takahisa Ueda et al

It is certified that error appears in the above-identified patent and that said Letters Patent is hereby corrected as shown below:

Claim 3, column 10, line 33, "wave" should be "woven".

Signed and Sealed this

Twenty-third Day of November, 1993

Attest:

BRUCE LEHMAN

Attesting Officer

Commissioner of Patents and Trademarks